Paul Ehrlich, Hampden, Mass., and Robert N. Pittilo, Texas City, Tex., assignors to Monsanto Chemical Company, St. Louis, Mo., a corporation of Delaware Filed Feb. 26, 1958, Ser. No. 717,701

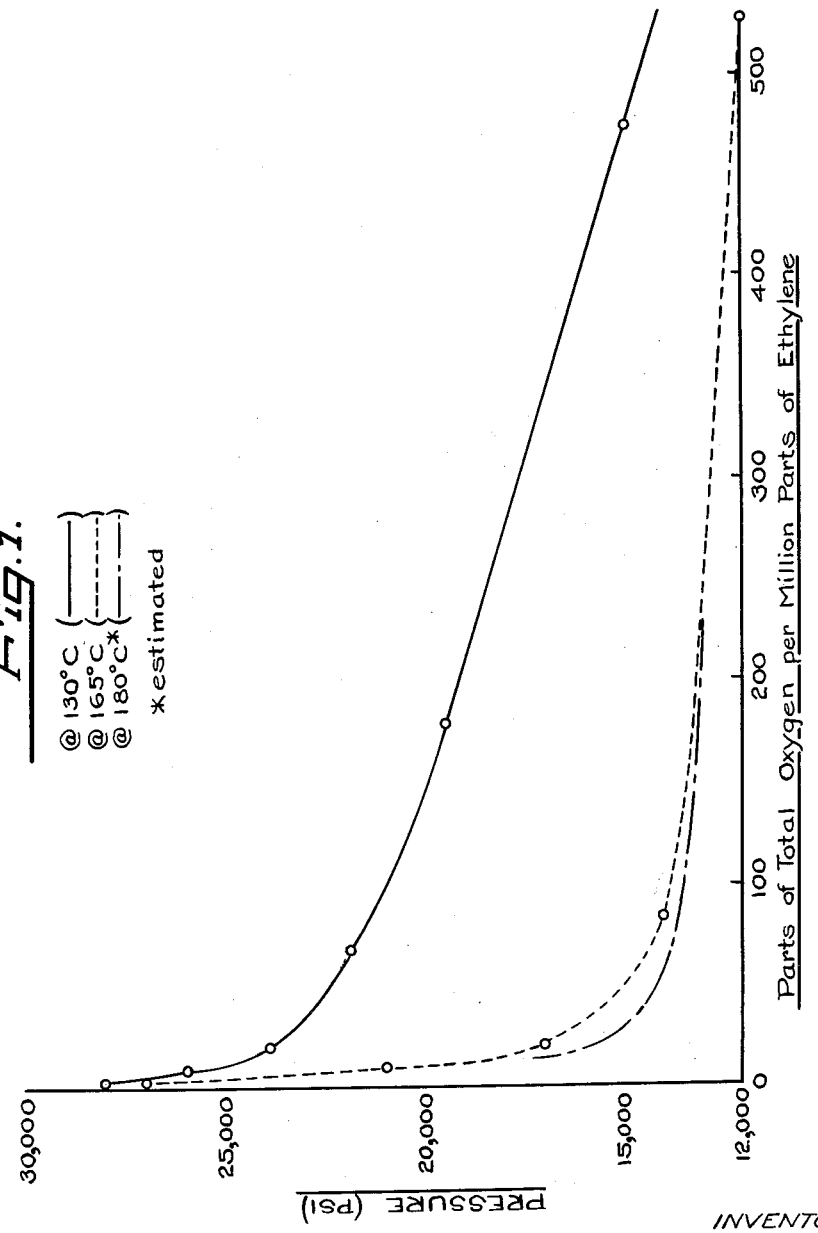
CRITICAL POLYMERIZATION PRESSURE OF ETHYLENE 2,979,496
LOW TEMPERATURE POLYMERIZATION OF ETHYLENE

3 Claims. (Cl. 260—94.9)

This invention relates to the high-pressure polymerization of ethylene. More particularly, it relates to a polymerization catalyst and the polymerization of ethylene therewith at low temperature.

Ethylene polymers formed at low process temperatures, i.e., 100 to 180° C., are known to possess properties making them especially desirable for many applications. For example, the lower the polymerization temperature employed the higher will be the melting point, density, crystallinity, rigidity, etc. of the polymers formed. Heretofore, it has been commercially impractical to produce such polymers continuously by oxygen-initiated processes (see Fawcett et al., U.S. 2,153,553) since the polymerization rates at temperatures below about 180° C. become inordinately slow. Even batch processes become impractical at temperatures below about 130° C.

It is an object of this invention to provide a process whereby ethylene may be polymerized continuously, or at reasonable batch rates, at temperatures of from 100 to 180° C. using an oxygen initiated system.

Another object is to provide low temperature ethylene polymerizates via an oxygen-initiated process.

A further object is to provide a novel ethylene polymerization catalyst derived in part from the reaction of oxygen and ethylene.

These and other objects are attained by first preparing an ethylene polymerization catalyst dissolved in ethylene by reacting oxygen with ethylene in the proportions of from 50 to 10,000 parts by weight of oxygen per million parts of ethylene at a pressure below the critical polymerization pressure of said ethylene and at a temperature of from 130 to 190° C. until from 30 to 90% of the oxygen is in chemically combined form. The catalyst solution is subsequently intimately combined with fresh substantially oxygen-free ethylene in such proportions that the final mixture contains from 10 to 4000 parts of oxygen per million parts of ethylene. Finally the ethylene therein is polymerized at a pressure above the critical polymerization pressure of said ethylene at a temperature of from 100 to 180° C.

The "critical polymerization pressure" is that pressure below which ethylene cannot be made to polymerize in appreciable quantity for given temperature and total oxygen concentration conditions. This phenomenon is peculiar to oxygen-initiated ethylene polymerizations only. The relationship between the critical polymerization pressure, temperature and total oxygen concentration is shown in the figure. Note that for any given temperature the critical polymerization pressure decreases with increasing total oxygen concentration; decreasing sharply at low total oxygen concentrations but eventually tending toward a plateau at high total oxygen concentrations.

The following examples are given in illustration of the invention and are not intended as limitations thereof. Where parts are mentioned they are parts by weight.

EXAMPLE I

About 10,000 parts of substantially oxygen-free ethylene and about 5 parts of oxygen are charged in intimate mixture to a pressure vessel maintained at a pressure of 10,000 p.s.i. The temperature of the reaction mixture is raised to and maintained at 165° C. for a period of 5 minutes after which time about 50% of the oxygen has entered into chemical combination with a portion of the ethylene. An ethylene solution of a catalytic mixture of oxygen and an oxygen-ethylene complex is obtained.

Similar ethylene polymerization catalyst solutions are obtained using other temperatures, pressures and oxygen concentration, as shown in Table I.

*Table I*

| Example | Pressure, p.s.i. | Temperature, ° C. | Oxygen, p.p.m. | Percent Reacted | Reaction Time, min. |
|---|---|---|---|---|---|
| IA | 10,000 | 165 | 500 | 50 | 5 |
| IB | 10,000 | 130 | 1,000 | 40 | 60 |
| IC | 10,000 | 180 | 150 | 85 | 2 |
| ID | 6,000 | 180 | 4,000 | 60 | 4 |

EXAMPLE II

The ethylene polymerization catalyst solution prepared in Example I is charged to a second pressure vessel equipped with external cooling means where it is intimately mixed with about 90,000 parts of substantially oxygen-free ethylene at a pressure of 35,000 p.s.i. and a temperature of 130° C. Almost instantaneously a sharp drop in pressure is observed as polymerization occurs; the heat of polymerization being substantially completely removed by cooling to avoid an explosive reaction. After 2 minutes' total reaction time the polymerization mixture is cooled to about 50° C. and the pressure is released. A rubbery mass of ethylene polymer having an average molecular weight, by osmotic pressure, of about 170,000 is obtained in about 18% yield. The polymer melts at about 119° C., has a density of about 0.925 gms. per cc. and analyzes about 1.7 methyl groups per 100 carbon atoms in the polymer backbone by infrared spectroscopy.

Example II is repeated using various temperatures, pressures and catalyst concentrations, with results as shown in Table II.

*Table II*

| Ex. | Press., p.s.i. | Temp., ° C. | Catalyst Conc.[1] | Reaction Time (Min.) | M.W.[2] | Melt. Pt. (° C.) | Density, gms./cc. |
|---|---|---|---|---|---|---|---|
| IIA | 35,000 | 165 | 25 | 1 | | 116 | 0.923 |
| IIB | 35,000 | 130 | 50 | 2 | 170 | 121 | 0.928 |
| IIC | 25,000 | 200 | 25 | 1 | 70 | 111 | 0.920 |
| IID | 25,000 | 130 | 450 | 10 | 48 | 119 | 0.925 |
| IIE | 25,000 | 100 | 4,000 | 180 | 28 | 127 | 0.932 |
| IIF | 20,000 | 165 | 215 | 3 | 150 | 114 | 0.920 |

[1] Parts of total oxygen per MM parts of ethylene.
[2] Number average molecular weight by osmotic pressure by thousands

EXAMPLE III

Example II is repeated except that the ethylene polymerization catalyst solution from Example I is cooled to 20° C. and stored at a pressure of 4,000 p.s.i. for about 24 hours before use. An ethylene polymer is obtained having substantially identical properties to the polymer obtained in Example II.

For clarity of description, the process of this invention is best divided into two basic parts. Part A is concerned with the preparation of the polymerization catalyst solution and Part B deals with the polymerization of ethylene with the catalyst solution.

PART A

The ethylene polymerization catalyst is prepared by reacting oxygen with ethylene at a pressure below the critical polymerization pressure of the ethylene and at a temperature of from 130 to 190° C. until from 30 to 90% of the oxygen in the reaction mixture has been reacted. Oxygen concentrations of from 50 to 10,000 parts per million parts of ethylene are employed. The ethylene used need not be oxygen-free but any oxygen contained therein must be included as part of the total oxygen employed.

As has been stated, the variables of pressure, temperature and oxygen concentration are inter-related and determine the time required to react the desired proportion of the oxygen. Generally speaking, the reaction rate varies directly with temperature and with pressure. Obviously, it is most advantageous to prepare this ethylene polymerization catalyst at the higher reaction rates. Reaction periods of under 5 minutes are easily obtainable (see Table I) at temperatures of 165° C. and above, making it commercially practical to produce the ethylene polymerization catalyst in continuous high pressure reactors. At temperatures below 165° C. batch preparation of the catalyst becomes most practical. Pressures of from 5,000 to 12,000 p.s.i. are generally employed. However, the actual reaction pressure employed must be selected consistent with the temperature and catalyst concentration so as not to reach the critical polymerization pressure of the ethylene.

The exact nature of the ethylene polymerization catalyst of this invention is not known. However, it is known that a portion of the oxygen enters into chemical combination with a portion of the ethylene. It is further known that unless at least 30% of the oxygen is reacted, substantially instantaneous ethylene polymerizations cannot be achieved in the polymerization process. Furthermore, if less than 10% of the total oxygen remains in uncombined form in the catalyst solution when used, the ethylene polymerization rates are again sluggish. Therefore, the first part of the process of this invention produces an ethylene solution of a catalytic mixture of oxygen and oxygen-ethylene reaction products. These catalyst solutions will be stable at the reaction temperatures for a period of from several minutes to several hours depending upon the reaction conditions, but when cooled to temperatures below 50° C. they become stable for at least 24 hours. The extent of the reaction between the oxygen and the ethylene can easily be determined by galvanic cell measurements.

As has been mentioned, the catalyst preparation process lends itself equally well to either batch or continuous production depending predominantly upon the temperature employed. In continuous processes, it may be chosen to either pass the catalyst solution into the polymerization reactor as it is formed, or to cool the catalyst solution and pass it into a high pressure storage vessel from which it may be either continuously metered or employed in bulk in subsequent polymerization. In a preferred embodiment it is desired to pass the catalyst solution continuously into the polymerization reactor as described in Part B herein.

PART B

The ethylene polymerization catalyst solution prepared as in Part A herein is intimately mixed with fresh substantially oxygen-free ethylene in a suitable high-pressure vessel in proportions such that from 10 to 4,000 parts of total oxygen, both free and chemically combined, are present per million parts of ethylene. Both the ethylene presently added and the ethylene in the catalyst solution are used to determine the total parts of ethylene. This mixing step must be effected at a pressure below the critical polymerization pressure of the ethylene but substantially immediately thereafter the pressure may be raised above this critical point if desired.

Polymerization is effected in a suitable high pressure vessel equipped with either internal or external cooling means. Continuous or batch reactors may be employed depending upon the polymers desired and the processing conditions employed. Generally, the polymerizations are conveniently performed under constant pressure conditions, but such is not a limitation since it is only necessary that the pressure be maintained at some point intermediate the critical polymerization pressure and the explosive limit of the ethylene polymerization mixture. However, diminishing pressure processes wherein the pressure decreases as polymerization takes place, may be employed.

The mixture of ethylene and catalyst is introduced to the reaction vessel and then brought to the desired polymerization temperature in the range of from 100 to 180° C. and the pressure is increased to above the critical polymerization pressure of the ethylene. Generally speaking, the rate of polymerization varies directly with each of the variables of temperature, pressure and catalyst concentration. However, at no time should the polymerization conditions and catalyst concentration be permitted to attain the explosive limits so well-known to those skilled in the art. Therefore, polymerization reactions performed at elevated pressures become hazardous and should be employed only in combination with the lower polymerization temperatures or catalyst concentrations, pressures of about 40,000 p.s.i. being the maximum contemplated.

The heat released due to the exothermic nature of the ethylene polymerization must be at least partially and preferably totally removed during the polymerization. This is necessary to the obtainment of the desired low-temperature polymerizates and also to avoid attaining explosive conditions within the reactor.

Polymerization temperatures of from 120 to 180° C. are suitable for use in either continuous polymerization processes or batch processes. However, polymerization temperatures between 100 and 120° C. do not produce rapid polymerization rates at even the highest pressures and are therefore practically employed only in batch processes. Therefore, the specific polymerization process employed is essentially governed by the polymer desired. However, it is preferred to use continuous polymerization whenever possible.

After polymerization to an appreciable yield has been effected, i.e., from 10 to 25%, the ethylene polymer is recovered by means conventional to the art. Generally, either of two means may be employed. Releasing the pressure at polymerization temperatures generally gives white powdery polymer precipitates. Swollen amorphous polymer masses are recovered by first cooling the polymerization mixture and subsequently releasing the pressure.

The physical properties of low-temperature ethylene polymerizates are well-known in the art. For instance, the lower the polymerization temperature employed the higher the polymer melting point and the higher the density, rigidity, optical clarity, grease resistance, crystallinity, etc. Also the degree of short chain branching is directly proportional to the polymerization temperature.

These ethylene polymers may be used in the conventional polyethylene applications but are most advantageously employed in the applications which capitalize upon their special properties. Such uses include various specialty items including bottles, containers, closures, packaging films, wire and cable coatings, etc.

These polymers also may be modified by the incorporation of conventional additives such as lubricants, stabilizers, anti-oxidants, dyes, pigments, etc.

It is obvious that many variations may be made in the products and processes set forth above without departing from the spirit and scope of this invention.

What is claimed is:

1. A process for the polymerization of ethylene to solid polymers which comprises (1) preparing an ethylene polymerization catalyst by contacting oxygen with ethylene in a proportion of from 50 to 10,000 parts by weight of oxygen per million parts by weight of ethylene at a pressure below the critical polymerization pressure of said ethylene and at a temperature of from 130 to 190° C. until from 30 to 90% of the oxygen becomes chemically combined, the remaining 70 to 10% of the oxygen remaining uncombined as an active component of said ethylene polymerization catalyst, (2) combining said ethylene polymerization catalyst with further ethylene in such proportion that the total concentration of free plus chemically combined oxygen is from 10 to 4,000 parts by weight per million parts by weight of ethylene, and (3) polymerizing the ethylene at a pressure above the critical polymerization pressure of said ethylene at a temperature of from 100 to 180° C.

2. A process as in claim 1 wherein ethylene is continuously polymerized at a temperature of from 120 to 180° C.

3. A process as in claim 1 wherein ethylene is polymerized in batch at a temperature of from 100 to 120° C.

References Cited in the file of this patent

UNITED STATES PATENTS

| | | |
|---|---|---|
| 2,409,996 | Roedel | Oct. 22, 1946 |
| 2,852,501 | Richard et al. | Sept. 16, 1958 |

OTHER REFERENCES

"Organic Chemistry" (Astle and Shelton), published by Harper & Brothers, publishers, New York (1952), page 55 relied on.

Raff: "Polyethylene," Interscience Publishers Inc. (1956), page 61 relied upon.